Patented July 19, 1938

2,124,251

UNITED STATES PATENT OFFICE 2,124,251

N:N'-DIALKYL-2:2'-DIPYRAZOLE-ANTHRONYLS AND PROCESS OF MAKING SAME

Jakob Koch, Basel, and Max Bommer, Riehen, near Basel, Switzerland, assignors to firm Society of Chemical Industry in Basle, Basel, Switzerland No Drawing. Application February 19, 1936, Serial No. 64,778. In Switzerland March 8, 1935

5 Claims. (Cl. 260—45)

This invention relates to the manufacture of N:N'-dialkyl-2:2'-dipyrazole-anthronyls by introducing into a 2:2'-dipyrazole-anthronyl at least one alkoxy-alkyl-group and, if desired, treating the product obtained by a condensing and/or substituting agent.

2:2'-dipyrazole-anthronyls which constitute the parent materials for this invention are, for example, the 2:2'-dipyrazole-anthronyl as well as such 2:2'-dipyrazole-anthronyls as contain an alkyl-, for instance methyl-, ethyl- or benzyl-group, in place of the hydrogen atom of the imino-group of one of the pyrazole nuclei. To these dipyrazole-anthronyls belong, for example, the N-mono-ethyl- or N-mono-ethyl-2:2'-dipyrazole-anthronyl. All these parent materials may contain in the anthraquinone nucleus or nuclei halogens, for instance chlorine and bromine, further alkoxy- and nitro-groups, as well as substituted or unsubstituted amino-groups.

The introduction of at least one alkoxy-alkyl-group, for instance a methoxymethyl-, an ethoxymethyl-, an ethoxyethyl-, a buthoxyethyl- or a benzyl-hydroxyethyl-group, into the 2:2'-dipyrazole-anthronyl is effected by any known method; for example by alkylating the hydroxyalkylene group in the 2:2'-dipyrazole-anthronyls, in which the hydrogen atoms of the imino-groups are substituted by hydroxy-alkylene, such as hydroxy-ethylene, or by replacing the halogen in the 2:2'-dipyrazole-anthronyls, in which the hydrogen atoms of the imino-groups are substituted by a halogen alkylene-group, such as for instance chloro-methylene, by the alkoxy-group, for instance by the action of alkali alcoholates.

However, it is particularly advantageous to produce the N:N'-dialkyl-2:2'-dipyrazoleanthronyls by treating the 2:2'-dipyrazoleanthronyls with such alkylating agents which contain at least one alkoxy-group in the alkyl residue. Such alkylating agents are, for example, the ethers of polyhydric alcohols which contain only one non-etherified hydroxyl-group, for instance the glycol-mono-methyl-, -mono-ethyl- and mono-butyl ether, further the mono-ethyl ether of trimethylene glycol (HO—CH₂—CH₂—CH₂.OC₂H₅), the dimethyl-(ethoxyethyl)-carbinol

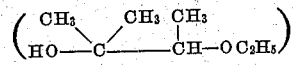

the mono-methyl ether of glycol-(hydroxyethyl)-ether (HO—CH₂—CH₂—OCH₂—CH₂—OCH₃) and the dimethylether of glycerine

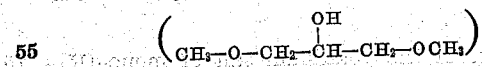

Alternatively, the esters of ethers of polyhydric alcohols may be used as alkylating agents, for example the hydrogen halide esters, the sulfuric acid esters and preferably the arylsulfonic acid esters; such esters are, for instance, the monochloro-methyl ether (Cl—CH₂—OCH₃), the chloroethyl-methyl-ether (Cl—CH₂—CH₂—OCH₃), the diethyl ether of the α-mono-chloro-hydrine

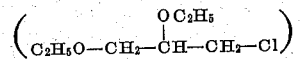

as well as the para-toluene-sulfonic acid ester of mono-methyl-, mono-ethyl- and mono-butyl-glycol.

The treatment with the alkylating agent occurs at a high temperature, for example between 120 and 200° C. Solutions or diluents, for instance nitro-benzene, chlorobenzene, trichlorobenzene, amyl-alcohol, naphthalene or anisol may be used in the treatment, and alkylation may be under pressure or in the open vessel. When unesterified ethers of polyhydric alcohols are used as alkylating agents, the alkylation is advantageously conducted in presence of acid, such as sulfuric acid. In the use of esters of ethers of polyhydric alcohol, the alkali salts, for instance, the sodium and potassium salts of the 2:2'-dipyrazole-anthronyls are used with advantage.

By the invention it is also possible to obtain N:N'-dialkoxy-alkyl-2:2'-dipyrazole-anthronyls which are substituted in the imino-groups by alkyl-groups which differ from each other; such products are obtained, by causing in a first stage para-toluene-sulfonic acid ester of glycol-monomethylether to act on the 2:2'-dipyrazole-anthronyl while in a second stage the para-toluene-sulfonic acid ester of the glycol-mono-ethylether is allowed to act, or the dipyrazole-anthronyl may be treated with mixtures of such alkylating agents containing alkoxy-alkyl-groups differing from each other. Furthermore, such products can be obtained by causing the para-toluenesulfonic acid ester of glycol-mono-methyl-ether to act on N-mono-methyl-2:2'-dipyrazole-anthronyl or by treating the N-mono-alkoxyalkyl-2:2'-dipyrazole-anthronyl with a substituting agent, such as methyl halide or ethyl halide.

The 2:2'-dipyrazole-anthronyls obtainable by the invention and containing at least one alkoxy-alkyl-group may be treated with condensing agents and/or substituting agents, for instance a halogenating agent, whereby further valuable products are obtained.

The new 2:2'-dipyrazole-anthronyls may be purified by crystallization or by conversion into their salts with strong acids, or by treatment with oxidizing agents, for instance alkali hypochlorite solution. They may be converted by known methods into the leuco-derivatives, for instance into the leuco-sulfuric acid esters.

The products of the invention are in part valuable new intermediate products and in part dyestuffs; the latter may be used, if desired, in admixture with N:N'-dimethyl- or -diethyl-2:2'-dipyrazole-anthronyls for dyeing and printing vegetable fibres, such as cotton, or for dyeing lacquers and plastic masses, as well as artificial silk, for instance acetate artificial silk. Insofar as the dyestuffs are soluble in water they may be used for dyeing animal fibers, for example wool and silk, according to a process used for acid dyestuffs. The dyeings and printings, particularly those that are red, which they produce, are very fast and, in many cases, change very little in tint when the direct dyeing is developed.

The following examples illustrate the invention, the parts being by weight, unless otherwise stated:—

Example 1

10.5 parts of finely pulverized dipotassium salt of 2:2'-dipyrazole-anthronyl are suspended in 70 parts of nitrobenzene. 14 parts of para-toluenesulfonic acid-ester of glycol-mono-methylether are added and the whole is heated while stirring. At about 140° C. reaction begins and the colour of the mixture changes from brown to red. Stirring is continued for about 16 hours at 150–160° C. and the whole is then allowed to cool. The dyestuff thus formed of the formula

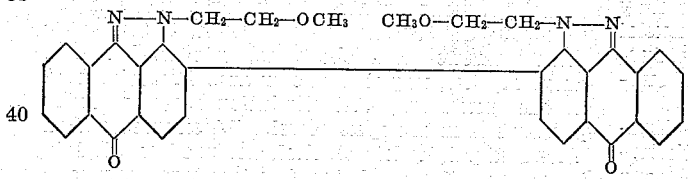

is filtered and boiled alternately with alcohol and water until the filtrate is practically colourless.

The dyestuff is a yellowish red powder. The solution in concentrated sulfuric acid is orange. In a greenish-blue vat cotton is dyed very powerful red tints of excellent properties of fastness. The dyeings are changed very little by soaping, in contrast with those of N:N'-diethyl-2:2'-dipyrazole-anthronyl, which on soaping turn very strongly to blue red.

Instead of nitrobenzene, ortho-dichlorobenzene or trichlorobenzene may be used as diluent.

Example 2

10.5 parts of the dry, finely pulverized dipotassium salt of 2:2'-dipyrazole-anthronyl are suspended in 70 parts of nitrobenzene. 14.7 parts of para-toluene-sulfonic acid-ester of glycol-mono-ethylether are added and the whole is heated while stirring. At about 140° C. reaction begins and the color of the mixture changes from brown to red. Stirring is continued for about 16 hours at 150–160° C. and the whole is then allowed to cool. The dyestuff thus formed of the formula

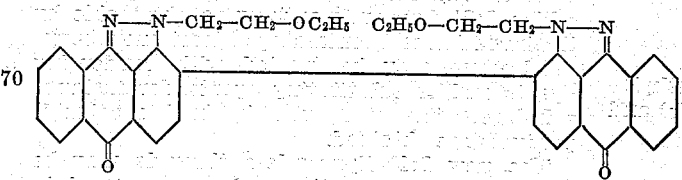

is filtered and boiled alternately with alcohol and water until the filtrate is practically colorless. The dyestuff is then dried.

The latter is a red powder. The solution in concentrated sulfuric acid is orange. In a greenish-blue vat cotton is dyed very powerful red tints of excellent properties of fastness. The dyeings practically do not change by soaping.

Example 3

10.5 parts of the dipotassium salt of 2:2'-dipyrazole-anthronyl are suspended in 85 parts of trichlorobenzene. 4.5 parts of para-toluenesulfonic acid ethylester are added and stirring is continued for about 7 hours at 160° C. The whole is then allowed to cool to about 80° C. and there are added 7 parts of para-toluenesulfonic acid-ester of glycol-mono-methyl-ether, whereupon the mixture is kept for a further 12 hours at 160° C. The working up is similar to that described in Example 1. The dyestuff of the probable formula

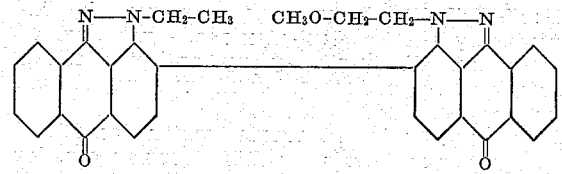

dissolves in concentrated sulfuric acid to an orange solution and also yields a greenish-blue vat. The red dyeings on cotton are of characteristic fastness and are practically unchanged by soap.

The same dyestuff may be made by a reverse procedure, namely by alkylating first with the para-toluenesulfonic acid-ester of glycol-monomethyl-ether and then with the para-toluenesulfonic acid-ethylester; a dyestuff which has similar tinctorial behaviour is obtained, if both alkylating agents are added at the beginning.

Instead of toluene-sulfonic acid-ethylester, its methyl-ester and/or instead of the para-toluenesulfonic acid-ester of glycol-mono-methylether the para-toluene-sulfonic acid-ester of glycol-mono-ethylether may be used for the production of a similar dyestuff.

Example 4

31.5 parts of dry, finely powdered dipotassium salt of 2:2'-dipyrazole-anthronyl are suspended in 225 parts of trichlorobenzene. 15 parts of para-toluenesulfonic acid-ester of glycol-mono-methylether are added and stirring is continued for about 10 hours at 160° C. After cooling, the mono-(N)-methoxy-ethyl-2:2'-dipyrazoleanthronyl is filtered and purified by extraction with water and alcohol.

15 parts of the product thus obtained are converted into the potassium salt.

11 parts of the potassium salt of mono-(N)- methoxyethyl - 2:2' - dipyrazole - anthronyl are mixed with 0.5 part of copper acetate and the further 12 hours. The dyestuff thus formed of the formula

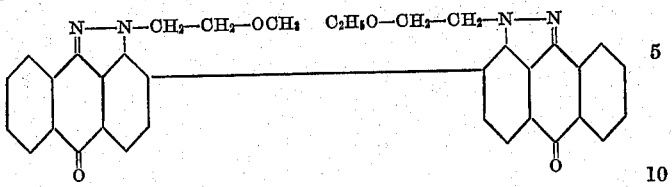

mixture is heated with 55 parts of ethylbromide in an autoclave for 4 hours at 160° C. After cooling, the dyestuff thus obtained is purified by extraction with boiling water and alcohol.

The dyestuff is identical with that obtained as described in Example 3.

*Example 5*

11 parts of N:N'-dimethoxyethyl-2:2'-dipyrazole-anthronyl are dissolved in 100 parts of fuming sulfuric acid containing 20 per cent. of $SO_3$, 0.1 part of iodine is added and, at about 50° C. 7 parts of bromine are allowed to drop in within about one hour. Stirring is continued for 2 hours at 50–60° C. and then the whole is transferred to ice. The separated dyestuff is filtered, washed neutral and dried. It is a green powder with a bronze lustre which dissolves in concentrated sulfuric acid to an orange solution. Cotton is dyed in a blue vat a bluish-red tint, which is practically unchanged by soaping.

The same dyestuff is obtained when 2:2'-dipyrazole-anthronyl is dibrominated and the methoxy-ethyl residue introduced into the iminogroups of the bromination product.

If in the above example, instead of N:N'-dimethoxyethyl-2:2'-dipyrazole-anthronyl there is used another N:N'-dialkoxy-alkyl-2:2'-dipyrazole-anthronyl similar dyestuffs are obtained.

Similar dyestuffs are also obtained by using chlorinating agents, such as, for example, chlorine or sulfuryl chloride, instead of bromine.

*Example 6*

10.5 parts of the dry, finely pulverized dipotassium salt of 2:2'-dipyrazole-anthronyl are suspended in 85 parts of trichlorobenzene. There are then added 5.1 parts of para-toluenesulfonic acid-ester of glycol-mono-ethylether and the whole is stirred for about 7 hours at 160° C. The mass is then allowed to cool to about 80° C. whereupon 6.9 parts of para-toluenesulfonic acid-ester of glycol-mono-methylether are added and the mixture is maintained at 160° C. for a further 12 hours. The dyestuff thus formed of the formula is separated by suction and boiled alternately with alcohol and water until the filtrate is practically colorless. The dyestuff is then dried.

The latter is a red powder. The solution in concentrated sulfuric acid is orange. In a greenish-blue vat cotton is dyed very powerful red tints of excellent properties of fastness. The dyeings practically do not change by soaping.

What we claim is:—

1. N:N'-dialkyl-2:2' - dipyrazole-anthronyls of which the two alkyl groups belong to the lower aliphatic series and at least one of the two alkyl groups represents an alkoxyalkyl group, which products are red powders, soluble in concentrated sulfuric acid to orange solutions and dyeing cotton from a blue colored vat red tints of very good fastness properties.

2. N:N' - dialkoxyalkyl - 2:2' - dipyrazole - anthronyls of which the dialkoxy alkyl groups belong to the lower aliphatic series, which products are red powders, soluble in concentrated sulfuric acid to orange solutions and dyeing cotton from a blue colored vat red tints of very good fastness properties.

3. N:N' - dimethoxyalkyl -2:2' - dipyrazole-anthronyls of which the alkyl groups belong to the lower aliphatic series, which products are red powders, soluble in concentrated sulfuric acid to orange solutions and dyeing cotton from a blue colored vat red tints of very good fastness properties.

4. N:N'-dimethoxyethyl - 2:2' - dipyrazole-anthronyls, which products are red powders, soluble in concentrated sulfuric acid to orange solutions and dyeing cotton from a blue colored vat red tints of very good fastness properties.

5. N:N' - diethoxyethyl - 2:2' - dipyrazole - anthronyl of the formula

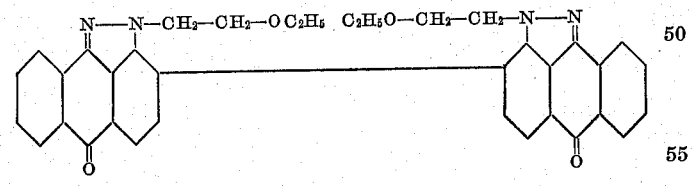

which product is a red powder, soluble in concentrated sulfuric acid to orange solutions and dyeing cotton from a greenish-blue colored vat red tints of very good fastness properties.

JAKOB KOCH.
MAX BOMMER.